(12) United States Patent
Cui et al.

(10) Patent No.: US 8,846,251 B2
(45) Date of Patent: Sep. 30, 2014

(54) PRELOADING LITHIUM ION CELL COMPONENTS WITH LITHIUM

(75) Inventors: Yi Cui, Stanford, CA (US); Song Han, Foster City, CA (US); Mark C. Platshon, Menlo Park, CA (US)

(73) Assignee: Amprius, Inc., Sunnyvale, CA (US)

( * ) Notice: Subject to any disclaimer, the term of this patent is extended or adjusted under 35 U.S.C. 154(b) by 628 days.

(21) Appl. No.: 12/944,593

(22) Filed: Nov. 11, 2010

(65) Prior Publication Data

US 2011/0111304 A1 May 12, 2011

Related U.S. Application Data

(60) Provisional application No. 61/260,294, filed on Nov. 11, 2009.

(51) Int. Cl.
*H01M 4/13* (2010.01)
*H01M 4/58* (2010.01)

(52) U.S. Cl.
USPC .................................. 429/231.95; 429/231.8

(58) Field of Classification Search
CPC ............ H01M 4/02; H01M 4/13; H01M 4/58
USPC ........... 429/231.8, 231.95; 977/948; 29/623.5
See application file for complete search history.

(56) References Cited

U.S. PATENT DOCUMENTS

| | | | |
|---|---|---|---|
| 6,541,158 B2 | 4/2003 | Frysz et al. | |
| 6,677,082 B2 | 1/2004 | Thackeray et al. | |
| 6,680,143 B2 | 1/2004 | Thackeray et al. | |
| 7,382,603 B2 | 6/2008 | Timonov et al. | |
| 7,498,100 B2 | 3/2009 | Christensen et al. | |
| 7,816,031 B2 | 10/2010 | Cui et al. | |

(Continued)

FOREIGN PATENT DOCUMENTS

| | | |
|---|---|---|
| JP | 2007-122992 | 5/2007 |
| JP | 2007-328932 | 12/2007 |

(Continued)

OTHER PUBLICATIONS

U.S. Application entitled "Electrode Including Nanostructures for Rechargeable Cells", U.S. Appl. No. 12/437,529, filed May 7, 2009.

(Continued)

*Primary Examiner* — Patrick Ryan
*Assistant Examiner* — Kiran Quraishi
(74) *Attorney, Agent, or Firm* — Weaver Austin Villeneuve & Sampson LLP (57) ABSTRACT

Provided are novel negative electrodes for use in lithium ion cells. The negative electrodes include one or more high capacity active materials, such as silicon, tin, and germanium, and a lithium containing material prior to the first cycle of the cell. In other words, the cells are fabricated with some, but not all, lithium present on the negative electrode. This additional lithium may be used to mitigate lithium losses, for example, due to Solid Electrolyte Interphase (SEI) layer formation, to maintain the negative electrode in a partially charged state at the end of the cell discharge cycle, and other reasons. In certain embodiments, a negative electrode includes between about 5% and 25% of lithium based on a theoretical capacity of the negative active material. In the same or other embodiments, a total amount of lithium available in the cell exceeds the theoretical capacity of the negative electrode active material.

15 Claims, 9 Drawing Sheets

(56) References Cited

U.S. PATENT DOCUMENTS

| | | | |
|---|---|---|---|
| 2002/0018935 | A1 | 2/2002 | Okada |
| 2003/0003362 | A1 | 1/2003 | Leising et al. |
| 2004/0131934 | A1 | 7/2004 | Sugnaux et al. |
| 2005/0079421 | A1 | 4/2005 | Konishiike et al. |
| 2005/0130043 | A1 | 6/2005 | Gao et al. |
| 2006/0003226 | A1 | 1/2006 | Sawa et al. |
| 2006/0057433 | A1 | 3/2006 | Ando et al. |
| 2006/0194115 | A1 | 8/2006 | De Jonghe et al. |
| 2007/0148549 | A1* | 6/2007 | Kobayashi et al. ...... 429/231.95 |
| 2008/0299455 | A1 | 12/2008 | Shiozaki et al. |
| 2008/0311475 | A1 | 12/2008 | Manev et al. |
| 2009/0004566 | A1* | 1/2009 | Shirane et al. ................ 429/220 |
| 2009/0042102 | A1 | 2/2009 | Cui et al. |
| 2009/0169996 | A1* | 7/2009 | Zhamu et al. ................ 429/221 |
| 2009/0208834 | A1 | 8/2009 | Ramasubramanian et al. |
| 2010/0173198 | A1 | 7/2010 | Zhamu et al. |
| 2011/0076561 | A1 | 3/2011 | Kuriki et al. |
| 2011/0171502 | A1 | 7/2011 | Kottenstette et al. |
| 2012/0045670 | A1 | 2/2012 | Stefan et al. |

FOREIGN PATENT DOCUMENTS

| | | | | |
|---|---|---|---|---|
| JP | 2009-199761 | | 9/2009 | |
| WO | WO 2007069389 A1 * | | 6/2007 | ............. H01M 4/02 |
| WO | 2011/085327 | | 7/2011 | |

OTHER PUBLICATIONS

Kasavajjula, et al. Nano-and bulk-silicon-based insertion anodes for lithium-ion secondary cells. J. Power Sources 163, 1003-1039 (2007).

Lee, Y.M., et al. SEI layer formation on amorphous Si thin electrode during precycling. J. Electrochem. Soc. 154, A515-A519 (2007).

WO Preliminary Report on Patentability and Written Opinion mailed Aug. 29, 2011 issued in Application No. PCT/US2011/020707.

WO patent application No. PCT/US2011/020707, Preliminary Report on Patentability and Written Opinion, mailed Aug. 29, 2011.

WO patent application No. PCT/US2011/020707, International Search Report mailed Aug. 29, 2011.

U.S. Appl. No. 13/245,530, Office Action mailed Nov. 21, 2012.

Kang, S.H. et al., "Stabilization of xLi2MnO2•(1—x)LiMO2 electrode surfaces (M=Mn, Ni, Co) with mildly acidic, fluorinated solutions", Journal of the Electrochemical Society, 155 (4) A269-A275 (2008).

"For high-performance anode material in lithium-ion batteries", After Gutengerg, Lithium Ion blog posts, Apr. 7, 2008, dowloaded from http://jcwinnie.biz/wordpress/?p=2864 on Jan. 7, 2011.

Thackeray, Michael M. et al., "Li2MnO3-stabilized LiMO2 (M=Mn, Ni, Co) electrodes for lithium-ion batteries", J. Mater. Chem., 2007, 17, 3112-3125, Aug. 14, 2007.

Chen, Libao et al., "Enhancing electrochemical performance of silicon film anode by vinylene carbonate electrolyte additive", Electrochemical and Solid-State Letters, 9 (11) A512-A515 (2006), Aug. 29, 2006.

Choi, Nam-Soon et al., "Surface layer formed on silicon thin-film electrode in llithium bis(oxalate) borate-based electrolyte", Journal of Power Sources 172 (2007) 404-409, Aug. 3, 2007.

Choi, Nam-Soon et al., "Effect of fluoroethylene carbonate additive on interfacial properties of silicon thin-film electrode", Journal of Power Sources 161 (2006) 1254-1259, Sep. 5, 2006.

WO patent application No. PCT/US2010/056162, International Search Report and Written Opinion, mailed Jul. 19, 2011.

WO patent application No. PCT/US2011/020707, International Search Report, mailed Aug. 29, 2011.

WO patent application No. PCT/US2011/053305, International Search Report and Written Opinion, mailed Apr. 10, 2012.

* cited by examiner

PRELOADING LITHIUM ION CELL COMPONENTS WITH LITHIUM

CROSS-REFERENCE TO RELATED APPLICATIONS

This application claims the benefit of U.S. Provisional Application No. 61/260,294, filed Nov. 11, 2009, entitled "PRELOADING LITHIUM ION CELL COMPONENTS WITH LITHIUM," which is incorporated herein by reference in its entirety for all purposes.

BACKGROUND

The demand for high capacity rechargeable electrochemical cells is strong. Many areas of application, such as aerospace, medical devices, portable electronics, and automotive, require high gravimetric and/or volumetric capacity cells. Lithium ion technology represents a significant improvement in this regard. However, to date, application of this technology has been primarily limited to graphite negative electrodes, and graphite has a theoretical capacity of only about 372 mAh/g during lithiation.

Silicon, germanium, tin, and many other materials are attractive insertion negative active materials because of their high electrochemical capacity. For example, the theoretical capacity of silicon during lithiation has been estimated at about 4,200 mAh/g. Yet many of these materials have not been widely adopted in commercial cells and batteries. One reason is the substantial change in volume these materials undergo during cycling. For example, silicon swells by as much as 400% when charged to its theoretical capacity corresponding to $Li_{4.4}Si$. Volume changes of this magnitude can cause considerable stresses in active material structures resulting in fractures and pulverization, loss of electrical connections within the electrode, and capacity fading of the cell.

It has been found that certain high capacity active materials may be kept below fracture stress levels during cycling by reducing the size of the active material structures. For example, silicon may be used in the form of nanowires that have sufficiently small cross sectional dimensions. Stress levels resulting from swelling of these small structures may stay be below the fracture limit for silicon. However, small structures have a large corresponding surfaces areas (per unit volume) exposed to the electrolyte. When a Solid Electrolyte Interphase (SEI) layer forms on this surface, substantial amounts of lithium are consumed and trapped in the layer making that lithium unavailable for cycling/charge carrying functions.

Overall, there is a need for improved applications of high capacity active materials in battery electrodes that minimize the drawbacks described above.

SUMMARY

Provided are novel negative electrodes for use in lithium ion cells. The negative electrodes include one or more high capacity active materials, such as silicon, tin, and germanium, and a lithium containing material prior to the first cycle of the cell. In other words, the cells are fabricated with some, but not all, lithium present on the negative electrode. This additional lithium may be used to mitigate lithium losses, for example, due to Solid Electrolyte Interphase (SEI) layer formation, to maintain the negative electrode in a partially charged state at the end of the cell discharge cycle, and other reasons. In certain embodiments, a negative electrode includes between about 5% and 25% of lithium based on a theoretical capacity of the negative active material. In the same or other embodiments, a total amount of lithium available in the cell exceeds the theoretical capacity of the negative electrode active material.

In certain embodiments, a negative electrode for use in a lithium ion cell includes a substrate and an active material disposed on the substrate and configured for inserting and removing lithium ions during battery cycling. The active material includes lithium prior to a first cycle of the lithium ion cell and one or more of the following elements: silicon, germanium, and tin. In certain embodiments, the active material also includes carbon. Lithium may be integrated into the structure of the active material.

The amount of lithium in the active material may be between about 5% and 25% based on the theoretical capacity of the active material. In the same or other embodiments, the amount of lithium in the active material is sufficient to compensate for lithium losses during SEI layer formation. A source of lithium may be one or more of the following: lithium metal, lithium silicides, lithium-metal alloys, lithium salts, lithium oxide, and lithium nitride. In certain embodiments, a source of lithium forms an alloy with the active material.

In certain embodiments, the active material forms an active layer in contact with the substrate. The concentration of lithium may differ throughout the thickness of this active layer. For example, lithium concentration may be less adjacent to the substrate than the exposed surface of the active layer. In certain embodiments, an intermediate layer is positioned between the substrate and the active layer.

In certain embodiments, an active material includes nanowires having an aspect ratio of at least about 10. In more specific embodiments, the nanowires are substrate rooted nanowires. An active material may include nanostructures each having a core and a shell that have different compositions. For example, lithium concentration in the cores may be on average greater than that in the shells. In another embodiment, lithium concentration in the cores is on average less than that in the shells. In a specific embodiment, the cores include silicon, while the shells include carbon.

In certain embodiments, a lithium ion cell includes a negative electrode having a negative active material disposed on a negative electrode substrate and configured for inserting and removing lithium ions during battery cycling, a positive electrode having a positive active material disposed on a positive electrode substrate and configured for inserting and removing the lithium ions during battery cycling and a separator for electronically isolating the negative electrode and the positive electrode in the lithium ion cell and for allowing the lithium ions to transfer between the negative electrode and the positive electrode during battery cycling. The total amount of lithium in the cell exceeds the negative electrode theoretical capacity and/or the positive electrode theoretical capacity. The negative electrode includes at least a fraction of the total amount of lithium prior to the first cycle of the battery. In specific embodiments, the total amount of lithium exceeds the negative electrode theoretical capacity by at least about 5%. In the same or other embodiments, the negative electrode includes at least about 5% of the total amount of lithium prior to the first cycle of the battery.

Provided also are methods of fabricating negative electrodes for use in lithium ion cells. A method may involve providing a substrate, depositing an active material, such as silicon, germanium, or tin, on the substrate and introducing lithium onto the active material.

These and other aspects of the invention are described further below with reference to the figures.

DETAILED DESCRIPTION OF EXAMPLE EMBODIMENTS

In the following description, numerous specific details are set forth in order to provide a thorough understanding of the present invention. The present invention may be practiced without some or all of these specific details. In other instances, well known process operations have not been described in detail to not unnecessarily obscure the present invention. While the invention will be described in conjunction with the specific embodiments, it will be understood that it is not intended to limit the invention to the embodiments.

Initial cycling of lithium ion cells, which is sometimes referred to as a formation cycling and involves one or multiple charge-discharge cycles, may result in partial decomposition of the electrolyte solvents on the negative electrode surface and formation of a solid electrolyte interphase (SEI) layer. While SEI layers are generally permeable to lithium ions they may increase cell's internal electronic resistance. Further, formation of an SEI layer may result in substantial amounts of lithium consumed from the electrolyte. It has been shown that an SEI layer formed on the silicon electrodes contained as much as 20% of lithium in addition to fluorine, oxygen, and carbon (see, Lee, Y. M., et al. "*SEI Layer Formation of Amorphous Si Thin Electrode during Precycling*," Journal of the Electrochemical Society, 154(6), A515-A519, 2007). An SEI layer traps lithium making it unavailable as a charge carrier during cycling. That results in capacity fading (i.e., increasing capacity loss over multiple cycles). In fact, SEI layer formation has been identified as one of the main contributors to the capacity fading in lithium ion cells with silicon electrodes (Lee, et al). Silicon electrodes may have an unstable SEI layer because of swelling, which may cause lithium losses even after initial cycling.

Figure 1A:
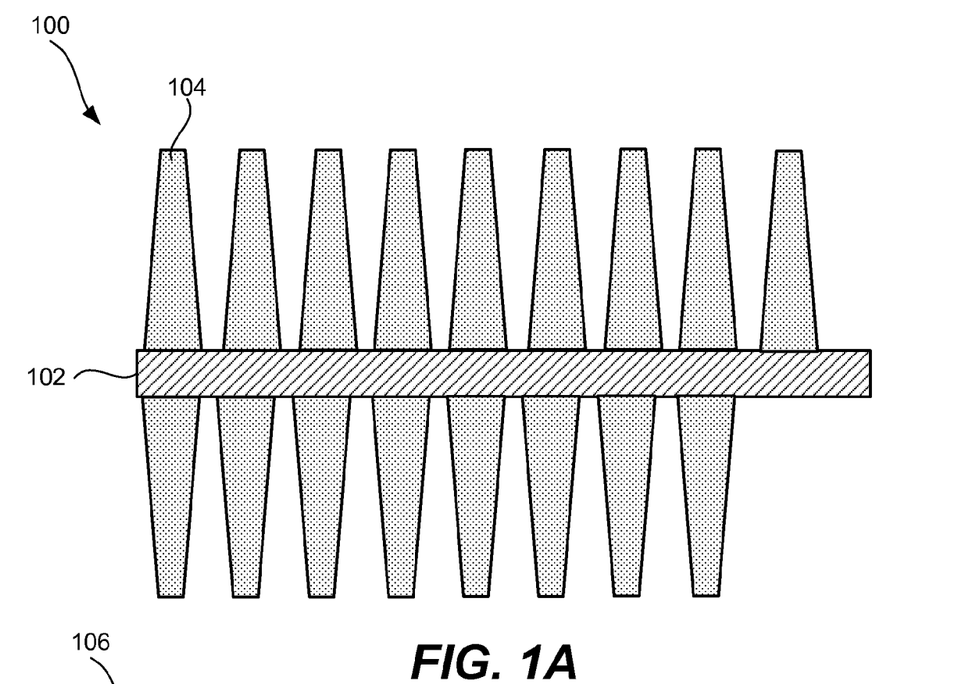
FIGS. 1A and 1B illustrate schematic representations of a side view and a top view of an electrode portion containing substrate-rooted active material nanostructures in accordance with certain embodiments.
Figure 1B:
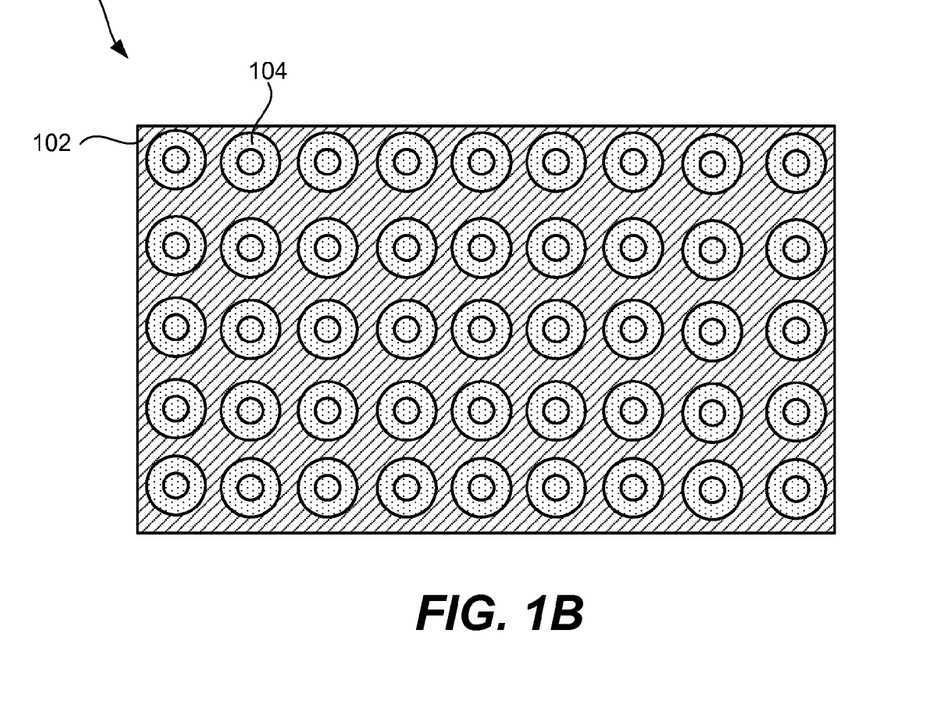

The amount of lithium lost to an SEI layer generally depends on the electrode surface area exposed to the electrolyte (i.e., an SEI layer area) in addition to other factors, such as the electrode surface composition, electrolyte composition, and charge-discharge rates. As suggested above, degradation of electrodes containing high capacity active materials may be overcome, to a certain degree, by providing these materials as nanostructures. In certain embodiments, such nanostructures have at least one dimension (more typically two) that is less than 1 micrometer. A description of various nanostructures is provided in U.S. patent application Ser. No. 12/437,529 filed on May 7, 2009, which is incorporated by reference herein in its entirety for purposes of describing nanostructure types, dimensions, and compositions. While the small dimensions of nanostructures provide improved resistance to mechanical degradation, they also result in large surface areas being exposed to the electrolyte and large lithium losses to SEI layer formation. FIGS. 1A and 1B are schematic representations of a side view 100 and a top view 106 of an electrode portion containing nanostructured active material 104 deposited on the substrate 102 in accordance with certain embodiments. The difference in exposed surfaces of between nanostructured electrodes and conventional flat electrodes can be illustrated in the following example. Exposed surface areas of the two electrode layers containing the same amount of active material are compared. The first electrode has a 5 micrometer thick silicon layer, while the second has a layer containing 100 nanometers thick 20 micrometer long nanowires arranged with 25% density. The second electrode layer has an exposed surface area that is about 200 times greater than that of the first layer. As a result, substantially more lithium will be consumed to form an SEI layer in this second electrode containing the nanowires.

Further, many high capacity materials have high electrical resistance. For example, resistivity of graphite in only $1.375 \times 10^{-5}$ Ohm-meter, while undoped silicon has resistivity of about $6 \times 10^2$ Ohm-meter or about seven orders of magnitude higher. When high capacity materials are lithiated during charging, their resistivity decreases substantially. Therefore, it may be beneficial and practical to retain some lithium in the negative electrode even at the complete discharge state. Further, without being restricted to any particular theory, it is believed that retaining some lithium in high capacity materials may reduce fractures during cycling. However, retaining lithium in the negative electrode makes this lithium unavailable for charge carrying. In a particular embodiment, a negative electrode include silicon, which in a discharged state still retains some lithium representing between about 500 mAh/g and 1500 mAh/g (e.g., about 1000 mAh/g). In the same or other embodiments, a silicon-based electrode in a charged state containing lithium representing between about 2000 mAh/g and 3500 mAh/g or, more specifically, between about 2500 mAh/g and 3000 mAh/g.

In a conventional lithium ion cell, a positive electrode and electrolyte contains all initial lithium provided into the cell during assembly. Typically, amounts of lithium provided on the positive electrode correspond to the negative electrode capacity, for example, being 5-10% less than the theoretical capacity of the negative electrode. This safety margin is typically used to overcome uneven distribution of active materials on corresponding negative and positive electrodes. Lithium introduced into the cell is then cycled back and forth between the negative and positive electrode (sometimes referred as a "rocking chair" cell). Distribution of lithium between the two electrodes depends on the charge of the cell and other factors, such as lithium losses due to the SEI layer formation, dendrites, and others. Removal of all lithium from the negative or positive electrode is typically not practical and some lithium resides on the respective electrodes at both ends of the cycle. Charge and discharge states of the cell may be somewhat arbitrary but are typically determined by defined respective cut-off voltages.

In certain embodiments, a cell is fabricated with more lithium than can be accommodated either by a positive electrode, a negative electrode, or both at standard operation conditions. In other words, the total amount of lithium in the cell exceeds theoretical capacities of the negative active material and positive active material. In these situations cut-off voltages are adjusted accordingly to control distribution of lithium between the two electrodes and avoid exceeding these theoretical capacities on either electrode. Further, an amount of lithium available for cycling may be depleted over time and cut-off voltages are then adjusted to accommodate for such depletion and compensate for capacity looses associated with depletion. If an amount of lithium available for cycling exceeds the negative electrode capacity, then the charge cut-off voltage is kept at a level lower than the one for a conventional cell with similar electrode types (e.g., 4.2V for a graphite/lithium-cobalt oxide combination). In the same or other embodiments, if an amount of lithium available for cycling exceeds the positive electrode capacity, then the discharge cut-off voltage is kept at a level that is higher than the one for a conventional cell with similar electrode types (e.g., 2.0 V for a graphite/lithium-cobalt oxide combination). For example, a cell may be assembled with a positive active material loaded with lithium to its maximum capacity (e.g., $LiCoO_2$ or $LiFePO_4$) and a pre-lithiated negative material. A discharge cut-off voltage is initially maintained at a level that is higher than for a conventional cell and would typically depend on the lithium excess amount. In certain embodiments, the discharge cut-off voltage is at least about 2.5 V, or more specifically at least about 2.75 V, or even more specifically at least about 3.0 V. As lithium available of cycling is depleted (e.g., caused by SEI layer formation) the discharge cut-off voltage is lowered and may eventually reached 2.0V if the lithium excess is irreversibly trapped.

Lithium provided on the positive electrode before cell assembly is a form of chemical compounds, multiple examples of which are provided below. While only lithium ions serve as charge carriers in the cell, they must be provided as part of compositions or intercalation substrates for processing and safety reasons. Unfortunately, lithium accounts for only a small fraction of the total mass of these compounds. For example, a weight percentage of lithium in $LiFePO_4$ is only 4.4%, and it is only 7.1% in LiCoO2 and 2.4% in $LiV3O_8$. As a result, the largest part of these compounds represents a "dead weight," particularly when lithium is trapped in the SEI layer.

It has been found that lithium can be introduced into the cells using components other than positive active materials and electrolytes. This lithium may be introduced in addition to lithium introduced in the positive active materials and electrolytes. This process is sometimes referred to herein as "pre-loading," or "pre-lithiation," "pre-doping," or "spiking" Lithium may be introduced as elemental lithium, such as lithium metal in the form of particles, flakes, thin foils, and other structures further described below, or as a compound or an alloy, such as a lithium-tin alloy. Once deposited, lithium containing materials may form chemical or physical bonds with cell components and remain on these components during battery assembly and, in certain embodiments, during initial cycling. In certain embodiments, additional lithium or lithium containing materials may react with materials of the cell components. For example, lithium may form silicide when introduced onto the surface of the silicon electrode. These and other examples are described below in more details.

In certain embodiments, lithium is introduced into a negative electrode prior to assembly of the cell. A typical negative electrode has a substrate and an active material layer, and lithium can be introduced in either of these two. In some examples, a substrate may be functionalized (e.g., coated with carbon) to accommodate lithium binding to the surface and subsequent release of the lithium during cycling.

Figure 2:
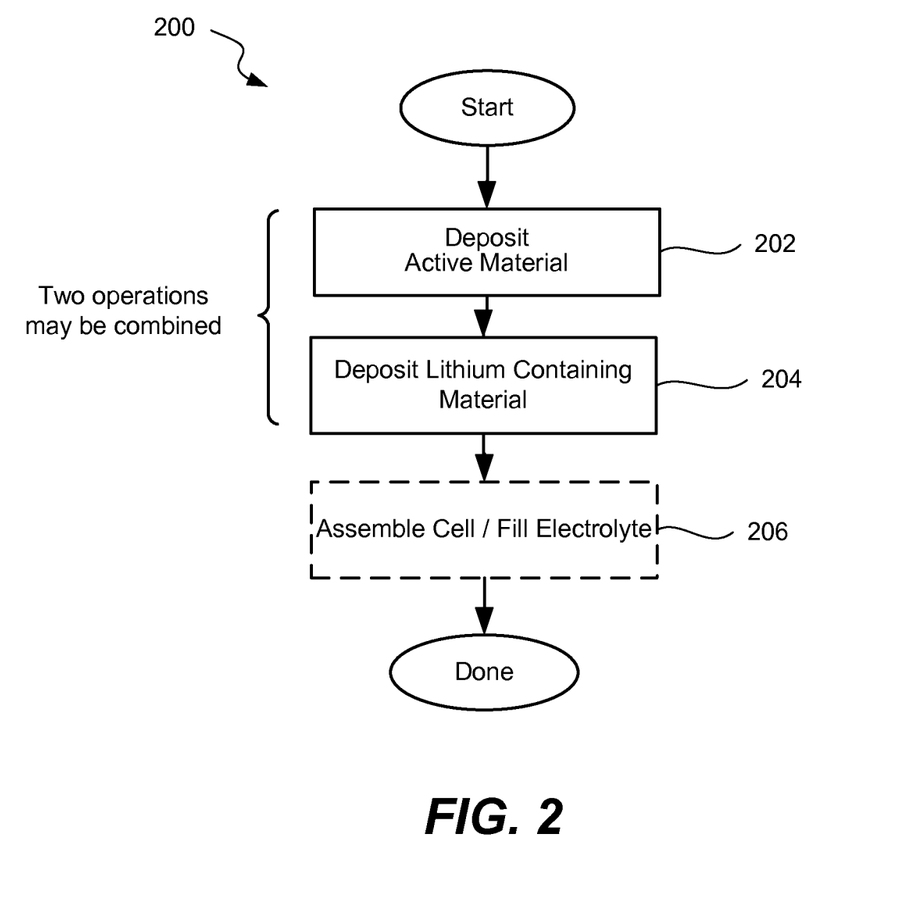
FIG. 2 is a general process flowchart of a method for fabricating electrodes that includes depositing a lithium containing material in accordance with certain embodiments.

In the same or other embodiments, lithium may be introduced into the active layer of the negative electrode. FIG. 2 is a general process flowchart of a method 200 for fabricating an electrode with a lithium containing material in accordance with certain embodiments. While references generally pertain to depositing lithium onto negative electrodes and more specifically onto negative active materials, it should be understood that the described process may be also applied to positive electrodes and other electrode components.

The process 200 may start with depositing an active material in operation 202. Various examples of this operation are described in U.S. patent application Ser. No. 12/437,529 filed on May 7, 2009, which is incorporated by reference herein in its entirety for purposes of describing deposition of active materials. The deposited active material may include one or more active materials, such as silicon, germanium, tin, tin oxide, titanium oxide, carbon, a variety of metal hydrides (e.g., $MgH_2$), silicides, phosphides, and nitrides. Other examples of active materials and their combinations include: carbon-silicon combinations (e.g., carbon-coated silicon, silicon-coated carbon, carbon doped with silicon, silicon doped with carbon, and alloys including carbon and silicon), carbon-germanium combinations (e.g., carbon-coated germanium, germanium-coated carbon, carbon doped with germanium, and germanium doped with carbon), and carbon-tin combinations (e.g., carbon-coated tin, tin-coated carbon, carbon doped with tin, and tin doped with carbon. In certain embodiments, the amount of silicon, tin, and/or germanium in the negative electrode is at least about 50%, or at least about 75%, or at least about 80%, or at least about 85%, or at least about 90% relative to the total amount of the negative active materials. The nanostructures used on positive electrodes may include one or more active materials, such as various lithium metal oxides (e.g., $LiCoO_2$, $LiFePO_4$, $LiMnO_2$, $LiNiO_2$, $LiMn_2O_4$, $LiCoPO_4$, $LiNi_{1/3}Co_{1/3}Mn_{1/3}O_2$, $LiNi_xCo_yAl_zO2$, $LiFe_2(SO4)_3$), carbon fluoride, metal fluoride, metal oxide, sulfur, and combination thereof. Doped and non-stoichiometric variations of these materials may be used as well. In certain embodiments, active materials may be arranged in core-shell structures with other active or inactive materials. Core materials are typically different from shell materials, and two adjacent cores typically have different materials. However, in certain embodiments, materials may only different based on their morphological structure (e.g., a crystalline silicon core and an amorphous silicon shell or vice versa). In certain embodiments, a core includes carbon while a shell includes silicon. In other embodiments, a core includes silicon while a shell includes carbon. In certain embodiments, the lithium concentration in the core is on average greater that the lithium concentration in the shell. In other embodiments, the lithium concentration in the core is on average less than the lithium concentration in the shell.

The deposited active material may be in various forms, such as a uniform thin layer, particles bound to the substrate with the polymeric binder, substrate rooted nanostructures, and other forms and structures. In certain embodiments, the deposited active materials are substrate rooted nanostructures. These nanostructures are physically and conductively attached to the substrate, which may serve as a current collector for the electrode. Nanostructures may be rooted to the substrate at random locations on the structure's profiles (randomly rooted), or rooted preferentially at some particular location on the nanostructures (non-randomly rooted). Terminally rooted nanostructures are preferentially affixed to the substrate at a terminal or distal end of the structures. This assumes that the nanostructures have (in general) some principal dimension that is longer than other dimensions of the structures. As explained below, various different nanostructures are contemplated, many of which will have terminuses or ends (and therefore be capable of terminal rooting). Prominent examples include nanowires and nanorods, which may have aspect ratios greater than one, or more specifically, greater than four.

Medially rooted nanostructures are preferentially affixed to the substrate at medial position (rather than a terminal position) on the nanostructures' profiles. Non-randomly rooted nanostructures need not have all the nanostructures or even nearly all of the nanostructures affixed to the substrate at the same relative location (e.g., a terminus or a particular medial position). However, they will on average have a higher fraction of the nanostructures rooted to the substrate at this particular location than would be accomplished if the nanostructures were attached to the substrate in a purely random fashion. On the other hand, non-rooted nanostructures will on average have a higher fraction of the nanostructures that are not rooted to the substrate. For example, nanostructures may be mixed with a binder to form slurry that is coated to the substrate. Most typically, a higher fraction of the nanostructure will not be in direct contact with or rooted to the substrate.

The unconnected or free ends of non-randomly rooted nanostructures may be aligned in a common direction or may be randomly aligned. For example, aligned terminally rooted nanowires may be aligned in a common direction with respect to the substrate, such as orthogonally to the substrate surface at the point of attachment. Alternatively, the aligned terminally rooted nanowires may be aligned generally at an angle of 30 degrees from the normal, 45 degrees from the normal, and other angles (not shown). Many other non-random orientations are possible; e.g., curved or zig-zagged.

In a typical nanostructure, at least one dimension (more typically two dimensions) of the active material fragments is less than about 1 micrometer. In certain embodiments, one dimension may be larger than the two others in which case this larger dimension is referred to as a principal dimension. A cross-section dimension is therefore defined as a distance between the two most separated points on a periphery of a cross-section that is transverse to the principal dimension. For example, a cross-section dimension of a cylindrical nano-rod circle is the diameter of the circular cross-section. In certain embodiments, a cross-section dimension of nanostructures is between about 1 nm and 1,000 nm. In more specific embodiments, a cross-section dimension is between about 5 nm and 500 nm, and more specifically between 10 nm and 200 nm. Typically, these dimensions represent an average or mean across the nanostructures employed in an electrode.

In certain embodiments, a substrate is a thin foil, however other substrate morphologies may be used as well. Such alternative substrates include mesh substrates, perforated sheet substrates, foam substrates, felt substrates, and the like. Typically, though not necessarily, the substrate will be conductive, having a conductivity of at least about $10^3$ S/m, or more specifically at least about $10^6$ S/m or even at least about $10^7$ S/m. This may be desirable when the substrate rooted structure is employed as a fully fabricated electrode for a battery or fuel cell. Examples of suitable substrate materials include, but not limited to, copper, titanium, aluminum, stainless steel, doped silicon, and other materials. In certain embodiments, an intermediate layer is formed between the substrate and the active layer (i.e., a layer containing the active materials). An intermediate layer may be used to protect the substrate during processing (e.g., deposition of the nanowires) and subsequent operation of the cell, improve adhesion of the active layer to the substrate, and other purposes.

Conductive attachment of the substrate rooted nanostructures to the substrate provides a direct path for electron and/or hole transport between the nanostructures and the substrate, thereby providing a continuous high conductivity (depending on the materials comprising the nanostructure and substrate) pathway. The path will not require that an electron or hole hop from the nanostructure to the substrate at the point of contact. In general, the nanostructures will be mechanically affixed to the substrate such that they are not removed except by breaking the structure. Thus, substrate rooted nanostructures are not connected to the substrate by elastomeric binder, for example. They may be affixed by various techniques such as pressure bonding, heating or annealing, physical bombardment, growth from the substrate, etc.

It should also be noted that substrate rooted structures may be produced by various techniques. In one class of fabrication techniques, the nanostructures are formed independently and subsequently affixed to the substrate by, e.g., annealing, impact, etc. Such techniques result in attachment rooted nanostructures. Another class of fabrication techniques forms nanostructures directly on the substrate by, e.g., chemical vapor deposition, physical vapor deposition, epitaxial growth, atomic layer deposition, and the like. Such techniques result in growth rooted nanostructures. In certain embodiments, such growth rooted techniques employ a catalytic growth or deposition process in which regions of catalyst on the substrate surface selectively promote growth of nanostructures at or proximate to the regions. A third class of fabrication techniques are etch rooted techniques. In these examples, regions of a substrate are selected etched away to yield nanostructures protruding above the remaining bulk of the un-etched substrate. Necessarily the etching process terminates prior to etching the whole way through the substrate. As a result, only some the original peripheral regions of the substrate etch away, while the bulk interior of the substrate remains. Detailed description of some of these techniques is described in U.S. patent application Ser. No. 12/437,529 filed on May 7, 2009 and U.S. Provisional Application 61/183,529 filed on Jun. 2, 2009, which are incorporated by reference herein in their entirety for purposes of describing nanostructure deposition and attachment techniques. Further, various substrate embodiments are described in U.S. Provisional Patent Application 61/260,298, entitled "CONDUCTING FORMATION CYCLES", filed on Nov. 11, 2010, which is incorporated by references herein in its entirety for purposes of describing substrates and technique for depositing active materials on these substrates.

Returning to FIG. 2, the process 200 may continue with depositing a lithium containing material onto one or more electrode components in operation 204. For example, lithium metal may be deposited over the active material deposited in operation 202. The pre-lithiated electrode may be generally prepared by physically, chemically, or electrochemically inserting lithium ions into the particles prior to assembly of the cell.

Figure 3A:
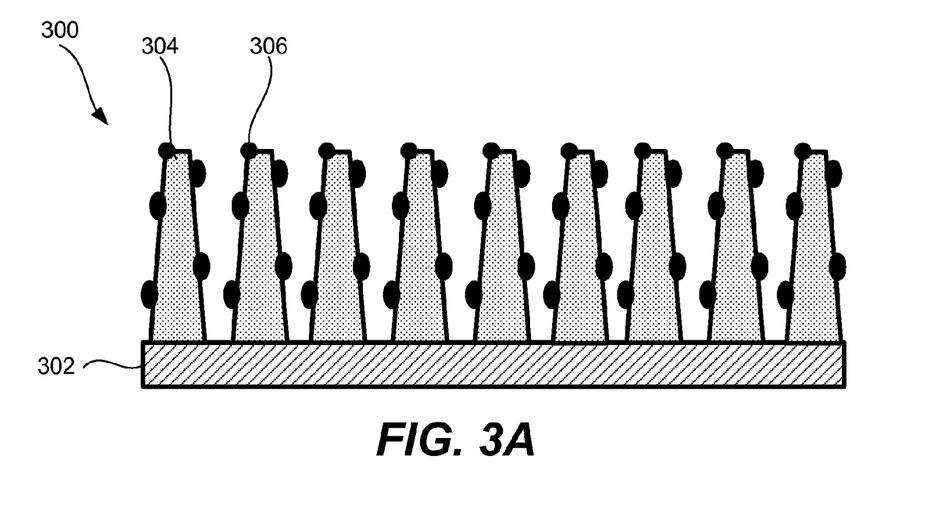
FIGS. 3A and 3B illustrate schematic representations of electrode examples during deposition of different forms of lithium containing materials in accordance with certain embodiments.

In certain embodiments, lithium deposited in operation 204 is in the form on lithium metal nanoparticles, nano-dots, or a nano-powder. FIG. 3A illustrates a schematic representations 300 of an electrode example during deposition of lithium containing particles 306 onto the active material nanostructures 304 that are rooted to the substrate 302. For examples, lithium nanoparticles with a diameter of approximately 10-50 nanometers and a specific surface area of about 30-50 meter squared per gram supplied by American Elements in Los Angeles, Calif. may be used. Lithium particles may be provided in coated (e.g., with lithium oxide or lithium nitride formed on the surface of the particles) and uncoated forms. Further, lithium nanoparticles may be functionalized to assist with deposition, adherence to the underlying components during cell assembly, and release during cycling. Other nanostructures include nanorods, nano-whiskers, nano-horns, nano-pyramids and other nano-composites.

In certain embodiments, particles are provided in a suspended form in a liquid. For example, lithium nanoparticles may be mixed into a slurry containing a solvent. The slurry may be then distributed over the active material surface, and the solvent is evaporated leaving the lithium nanoparticles on the active materials surface. In certain embodiments, electrostatic field may be used to assist distribution of the particles throughout the active material surface in these or other embodiments.

Figure 3B:
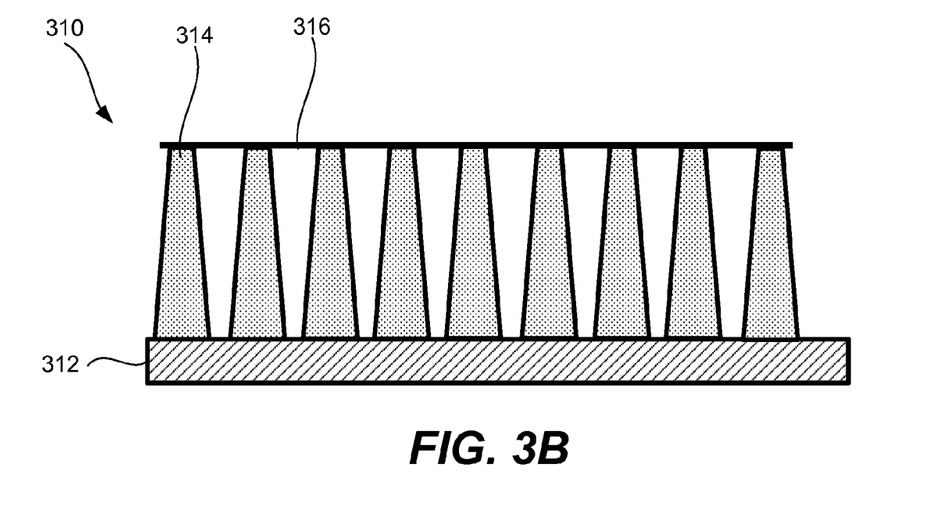

In some embodiments, lithium foil may be used to deposit lithium onto the active materials. FIG. 3B illustrates a schematic representation 310 of an electrode example during deposition of a lithium containing foil 316 over the active material nanostructures 314 rooted to the substrate 312. For example, lithium foils supplied by American Elements in Los Angeles, Calif. may be used. In certain embodiments, a thickness of the foil may need to be further reduced to ensure an appropriate amount of lithium deposited per unit area of the electrode. Lithium foil may be rolled over the active material and, in certain embodiments, compressed into the active material layer, for example, by passing it through a heated roller press.

In certain embodiments, lithium may be deposited using Atomic Layer Deposition (ALD), Physical Vapor Deposition (PVD), Chemical Vapor Deposition (CVD), E-Beam, and other techniques. For example, lithium may be introduced using ion implantation. This process includes generating lithium ions, accelerating the ions in the electrical field (e.g., between about 1 and 500 keV), and bombarding the active material layer with the accelerated ions. Some lithium ions may penetrate into the active material structures. Controlling electrical fields may be used to provide concentration gradients within the nanostructures and even to modify morphological structure of these nanostructures.

In certain embodiments, deposited lithium may be resputtered to provide even distribution and amount of lithium ion electrode. For example, an electrode with initial deposits of lithium may be introduced into a PVD chamber containing a lithium sputtering target. Lithium ions generated from the target may be directed towards the electrode surface using a bias voltage and an electromagnetic field. Lithium ion bombardment may cause both deposition and removal of some previously deposited lithium from the surface. Controlling the field strength and direction as well as bias voltage and other process parameters may be used to achieve target distribution of lithium on electrodes.

In electrochemical lithiation embodiments, a counter electrode containing a strip of lithium metal may be arranged into an electrochemical cell together with a partially fabricated electrode produced in operation 202. A counter electrodes is sometimes referred to as an auxiliary electrode. After introducing electrolyte, the two electrodes may be short circuited. In certain embodiments, voltage control may be necessary to control lithium deposition amount and prevent decomposition of the active materials and substrate on the partially fabricated electrode. Additional description of auxiliary electrodes is provided in U.S. Patent Application No. 61/386,868, entitled "AUXILIARY ELECTRODES FOR ELECTROCHMICAL CELLS CONTAINING HIGH CAPACITY ACTIVE MATERIALS," filed on Sep. 27, 2010, which is incorporated by reference herein in its entirety for purposes of describing lithiation using auxiliary electrodes.

In certain embodiments, lithium may be introduced into the active material structures during deposition of these structures. For example, a gas phase lithium introduction involves providing lithium containing precursors together with base material precursors, such as silane for silicon nanostructures. Relative flow rates of precursors may vary during deposition to achieve dopant concentration gradients within the nanostructures. Concentrations and types of precursors may determine amounts of lithium introduced into electrodes.

Amounts of lithium deposited in operation 204 may be characterized in different ways. In certain embodiments, lithium amounts correspond to between about 5% and 50% of the theoretical capacity of the negative active material or, more specifically, to between about 5% and 25% of that capacity. In these or other embodiments, a total amount of lithium available in the cell exceeds the negative active material theoretical capacity. For example, total amounts of lithium in the cell may exceed this theoretical capacity by at least about 5% or, more specifically, by at least about 10%, or at least about 25%.

Another way of characterizing amounts of lithium is by specifying its atomic concentration relative to, for example, negative active materials. In certain embodiments, a negative electrode includes between about 0.05 atomic percent and about 25 atomic percent of lithium relative to the negative active materials (e.g., silicon with inserted lithium) or, more specifically, between about 0.1 atomic percent and 10 atomic percent.

Once lithium is deposited, it may remain as elemental lithium (e.g., physically attached or in a form of an alloy) or react with other components in the electrode to form a chemical compound. In certain embodiments, lithium reacts with silicon in the negative active material to form silicides. For example, an overall structure including silicon nanowires and lithium particles deposited throughout the active layer and in the contact with the nanowires may be heated.

Lithium starting materials (e.g., a precursor) used for deposition in operation 204 may be as elemental lithium (e.g., particles, foils), chemical compounds, alloys, and other forms. All of these are generally referred to as lithium containing materials. Examples of alloys and chemical compounds include lithium-tin, lithium-germanium, lithium silicide, lithium carbide, lithium oxide, lithium nitride, and certain lithium salts.

Figure 4A:
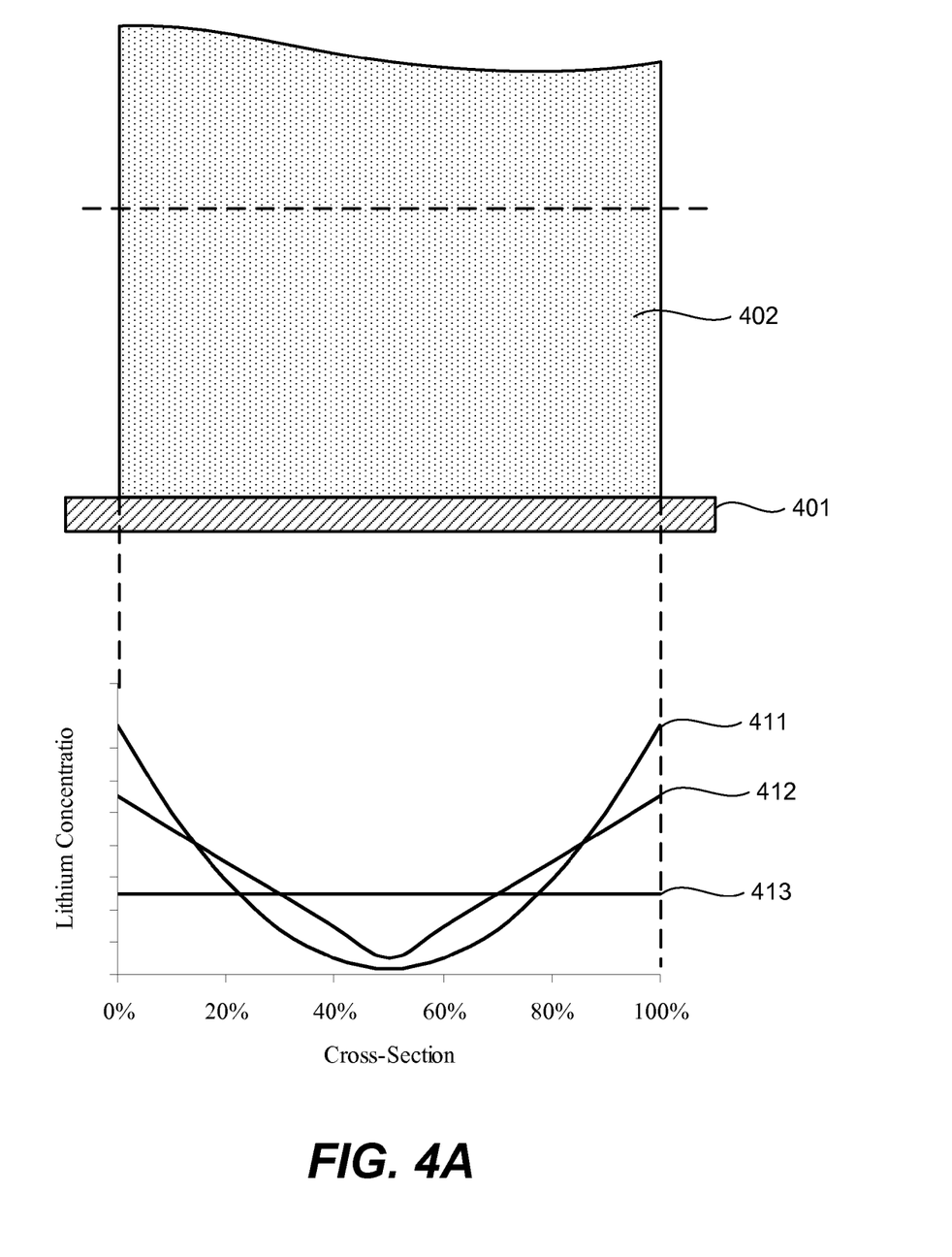
FIG. 4A is an example plot of different lithium concentration profiles across the nanostructure's cross-section in accordance with certain embodiments.

FIG. 4A is an example plot of different lithium concentration profiles across the nanostructure's cross-section in accordance with certain embodiments. In certain embodiments, lithium is evenly distributed throughout the entire volume of the nanostructures 402, i.e., lithium has a substantially uniform concentration distribution as illustrated with line 413. Such uniform distribution may result, for example, from lithium being introduced during deposition of the nanostructures or electrochemical deposition of nanostructures. In other embodiments, lithium concentration may be greater near the outer surface of the nanostructures. Two examples of lithium concentration distributions are illustrated with lines 411 and 412. For example, lithium may be introduced after depositing the nanostructures and then partially diffuse into the nanostructures.

Figure 4B:
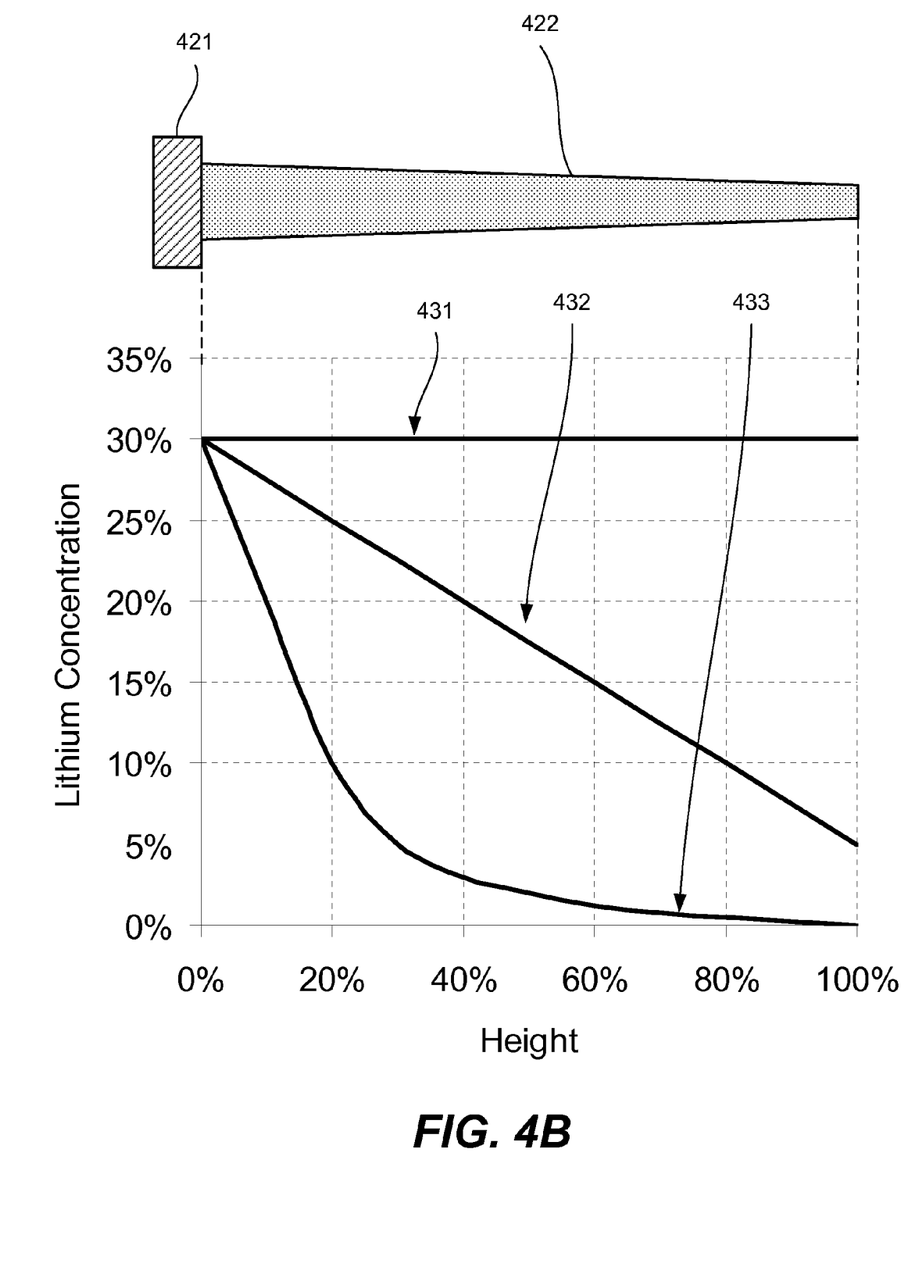
FIG. 4B is an example plot of different illustrative lithium concentration profiles along the nanostructure's length in accordance with certain embodiments.

FIG. 4B is an example plot of different illustrative lithium concentration profiles along the nanostructure's length in accordance with certain embodiments. In some embodiments, lithium concentration may be substantially the same along the length of the nanostructure as, for example, illustrated by line 431. In other embodiments, nanostructures may have higher lithium concentration near the substrate-rooted ends next to the substrate as, for example illustrated with lines 432 and 433. Varying lithium concentration may be achieved, for examples, by varying relative flow rates of lithium-containing precursors during the deposition operation. A higher lithium concentration near the substrate-rooted ends may help to reduce swelling of the nanostructures at the interface with the substrate and preserve mechanical and electrical attachment of the nanostructures to the substrate.

In certain embodiments, lithium may be added to positive active materials. For example, the active material may be in the form of $LiMO_2$, where M is a metal e.g., $LiCoO_2$, $LiNiO_2$, and $LiMnO_2$. Lithium cobalt oxide (LiCoO2) is a commonly used material for small cells but it is also one of the most expensive. The cobalt in LiCoO2 may be partially substituted with Sn, Mg, Fe, Ti, Al, Zr, Cr, V, Ga, Zn or Cu. Lithium nickel oxide (LiNiO2) is less prone to thermal runaway than LiCoO2, but is also expensive. Lithium manganese oxide (LiMnO2) is the cheapest in the group of conventional materials and has relatively high power because its three-dimensional crystalline structure provides more surface area, thereby permitting more ion flux between the electrodes. Lithium iron phosphate (LiFePO4) is also now used commercially as a positive active material. Examples of the positive active materials include: $Li\ (M'_xM''_y)O_2$, where M' and M" are different metals (e.g., $Li(Ni_xMn_y)O_2$, $Li(Ni_{1/2}Mn_{1/2})O_2$, $Li(Cr_xMn_{1-x})O_2$, $Li(Al_xMn_{1-x})O_2$), $Li(Co_xM_{1-x})O_2$, where M is a metal, (e.g. $Li(Co_xNi_{1-x})O_2$ and $Li(Co_xFe_{1-x})O_2$), $Li_{1-W}(Mn_xNi_yCo_z)O_2$, (e.g. $Li(Co_xMn_yNi_{(1-x-y)})O_2$, $Li(Mn_{1/3}Ni_{1/3}Co_{1/3})O_2$, $Li(Mn_{1/3}Ni_{1/3}Co_{1/3-x}Mg_x)O2$, $Li(Mn_{0.4}Ni_{0.4}Co_{0.2})O_2$, $Li(Mn_{0.1}Ni_{0.1}Co_{0.8})O_2$,) $Li_{1-W}(Mn_xNi_xCo_{1-2x})O_2$, $Li_{1-W}(Mn_xNi_yCoAl_W)O_2$, $Li_{1-W}(Ni_xCo_yAl_z)O_2$ (e.g., $Li(Ni_{0.8}Co_{0.15}Al_{0.05})O_2$), $Li_{1-W}(Ni_xCo_yM_z)O_2$, where M is a metal $Li_{1-W}(Ni_xMn_yM_z)O_2$, where M is a metal $Li(Ni_{x-y}Mn_yCr_{2-x})O_4$, $LiM'M''_2O_4$, where M' and M" are different metals (e.g., $LiMn_{2-y-z}Ni_yO_4$, $LiMn_{2-y-z}Ni_yLi_zO_4$, $LiMn_{1.5}Ni_{0.5}O_4$, $LiNiCuO_4$, $LiMn_{1-x}Al_xO_4$, $LiNi_{0.5}Ti_{0.5}O_4$, $Li_{1.05}Al_{0.1}Mn_{1.85}O_{4-z}F_z$, $Li_2MnO_3$) $Li_xV_yO_z$, e.g. $LiV_3O_8$, $LiV_2O_5$, and $LiV_6O_{13}$, $LiMPO4$ where M is a metal; lithium iron phosphate ($LiFePO_4$) is a common example. It is both inexpensive and has high stability and safety, because the relatively strong phosphate bonds tend to keep the oxygen in the lattice during overcharge, but has poor conductance and require substantial amounts of conductive additives, $LiM_xM''_{1-x}PO_4$ where M' and M" are different metals (e.g.$LiFePO_4$), $LiFe_xM_{1-x}PO_4$, where M is a metal, $LiVOPO_4$ $Li_3V_2(PO_4)_3$, $LiMPO_4$, where M is a metal such as iron or vanadium. Further, a positive may include a secondary active material to improve charge and discharge capacity, such as $V_6O_{13}$, $V_2O_5$, $V_3O_8$, $MoO_3$, $TiS_2$, $WO_2$, $MoO_2$, and $RuO_2$.

Returning to FIG. 2, the process 200 may continue with assembling the cell and filling it with electrolyte as shown in block 206. Two types of electrodes and a separator are aligned and arranged either into a stack or a jelly roll as described in the context of FIGS. 5A, 5B, 6A, 6B, 7, and 8.

A lithium ion cell using a liquid electrolyte typically includes a separator positioned as a sheet between the positive and negative electrodes. A separator is a membrane that both physically and electrically separates the two electrodes, thereby preventing the electrodes from shorting while lithium ions pass between the two electrodes. A separator should generally be ionically conductive and electronically insulating. A separator may also provide one or more aspects of thermal management in the cell; such as by increasing in ionic resistivity at higher temperatures and thereby preventing thermal runaways. A separator is made of electrically insulative materials that are also chemically stable and insoluble in the electrolyte. A separator typically has porosity sufficient to allow flow of the electrolyte through it during the electrochemical reaction of the cell, which is measured in percentages or Gurley unit ratings, i.e. a number of seconds required for 100 cubic centimeters of air to pass through 1.0 square inch of a given material at a given pressure differential, usually 2.3 cm Hg.

In one embodiment, a separator material may include a fabric woven from fluoro-polymeric fibers of polyethylenetetrafluoroethylene (PETFE) and polyethylenechlorotrifluoroethylene used either by itself or laminated with a fluoropolymeric microporous film. Moreover, a separator materials may include, polystyrenes, polyvinyl chlorides polypropylene, polyethylene (including LDPE, LLDPE, HDPE, and ultra high molecular weight polyethylene), polyamides, polyimides, polyacrylics, polyacetals, polycarbonates, polyesters, polyetherimides, polyimides, polyketones, polyphenylene ethers, polyphenylene sulfides, polymethylpentene, polysulfones non-woven glass, glass fiber materials, ceramics, a polypropylene membrane commercially available under the designation CELGARD from Celanese Plastic Company, Inc. in Charlotte, N.C., USA, as well as Asahi Chemical Industry Co. in Tokyo, Japan, Tonen Corporation, in Tokyo, Japan, Ube Industries in Tokyo, Japan, and Nitto Denko K.K. in Osaka, Japan. In one embodiment, a separator includes copolymers of any of the foregoing, and mixtures thereof.

A typical membrane has the following characteristic: air resistance (Gurley number) of less than about 800 sec, or less than about 500 in a more specific embodiment; thickness of between about 5 to 500 µm, or in specific embodiment between about 10 to 100 µm, or more specifically between about 10 and 30 µm; pore diameters ranging from between about 0.01 to 5 µm or more specifically between about 0.02 to 0.5 µm; porosity ranging from between about 20 to 85%, or more specifically, between about 30 to 60%.

Two common arrangements of the electrodes in lithium ion cells are wound and stacked. One goal is to position and align the surfaces of active layers of the two electrodes surfaces as close as possible without causing an electrical short. Close positioning allows lithium ions to travel more rapidly and more directly between the two electrodes leading to better performance.

Figure 5A:
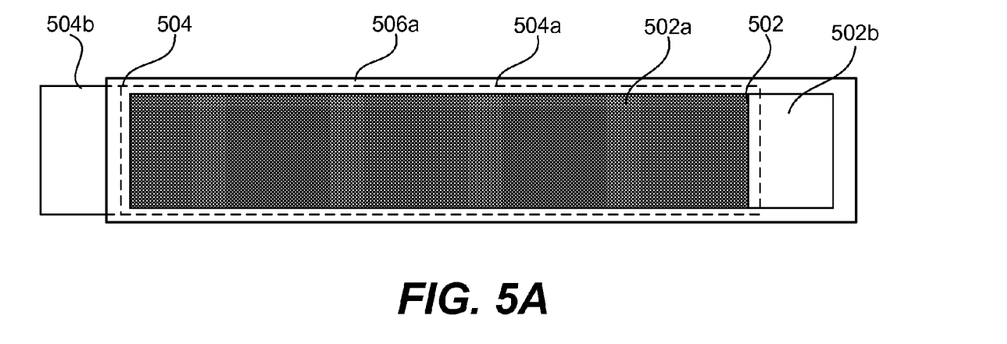
FIGS. 5A-B are a top schematic view and a side schematic view of an illustrative electrode arrangement in accordance with certain embodiments.

FIG. 5A illustrates a side view of an aligned stack including a positive electrode 502, a negative electrode 504, and two sheets of the separator 506a and 506b in accordance with certain embodiments. The positive electrode 502 may have a positive active layer 502a and a positive uncoated substrate portion 502b. Similarly, the negative electrode 504 may have a negative active layer 504a and a negative uncoated substrate portion 504b. In many embodiments, the exposed area of the negative active layer 504a is slightly larger that the exposed area of the positive active layer 502a to ensure trapping of the lithium ions released from the positive active layer 502a by intercalation material of the negative active layer 504a. In one embodiment, the negative active layer 504a extends at least between about 0.25 and 5 mm beyond the positive active layer 502a in one or more directions (typically all directions). In a more specific embodiment, the negative layer extends beyond the positive layer by between about 1 and 2 mm in one or more directions. In certain embodiments, the edges of the separator sheets 506a and 506b extend beyond the outer edges of at least the negative active layer 504a to provide electronic insulation of the electrode from the other battery components. The positive uncoated portion 502b may be used for connecting to the positive terminal and may extend beyond negative electrode 504 and/or the separator sheets 506a and 506b. Likewise, the negative uncoated portion 504b may be used for connecting to the negative terminal and may extend beyond positive electrode 502 and/or the separator sheets 506a and 506b.

Figure 5B:
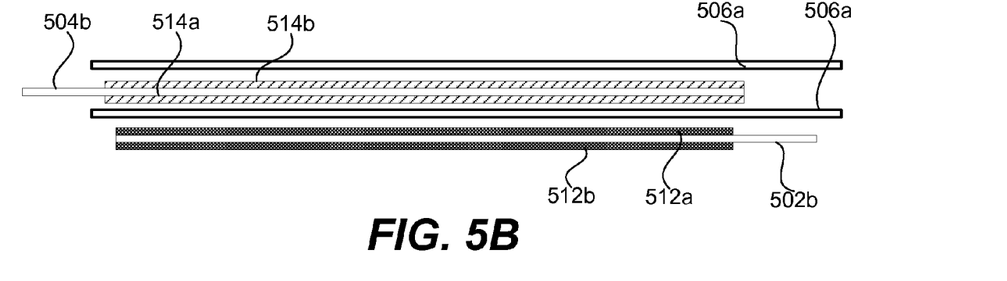

FIG. 5B illustrates a top view of the aligned stack. The positive electrode 502 is shown with two positive active layers 512a and 512b on opposite sides of the flat positive current collector 502b. Similarly, the negative electrode 504 is shown with two negative active layer 514a and 514b on opposite sides of the flat negative current collector. Any gaps between the positive active layer 512a, its corresponding separator sheet 506a, and the corresponding negative active layer 514a are usually minimal to non-existent, especially after the first cycle of the cell. The electrodes and the separators are either tightly would together in a jelly roll or are positioned in a stack that is then inserted into a tight case. The electrodes and the separator tend to swell inside the case after the electrolyte is introduced and the first cycles remove any gaps or dry areas as lithium ions cycle the two electrodes and through the separator.

Figure 6A:
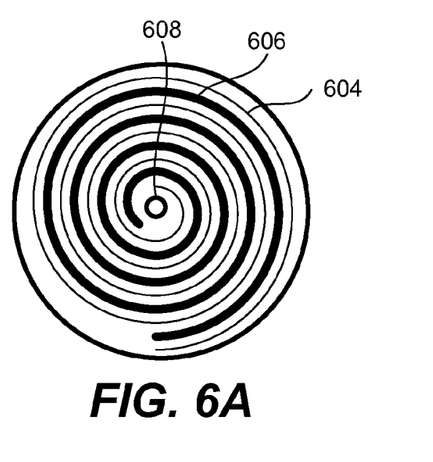
FIGS. 6A-B are a top schematic view and a perspective schematic view of an illustrative round wound cell in accordance with certain embodiments.
Figure 6B:
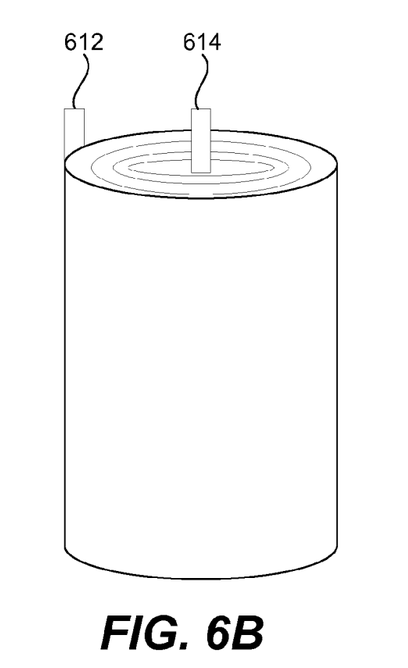

A wound design is a common arrangement. Long and narrow electrodes are wound together with two sheets of separator into a sub-assembly, sometimes referred to as a jellyroll, shaped and sized according to the internal dimensions of a curved, often cylindrical, case. FIG. 6A shows a top view of a jelly roll comprising a positive electrode 606 and a negative electrode 604. The white spaces between the electrodes represent the separator sheets. The jelly roll is inserted into a case 602. In some embodiments, the jellyroll may have a mandrel 608 inserted in the center that establishes an initial winding diameter and prevents the inner winds from occupying the center axial region. The mandrel 608 may be made of conductive material, and, in some embodiments, it may be a part of a cell terminal. FIG. 6B presents a perspective view of the jelly roll with a positive tab 612 and a negative tab 614 extending from the jelly roll. The tabs may be welded to the uncoated portions of the electrode substrates.

The length and width of the electrodes depend on the overall dimensions of the cell and thicknesses of active layers and current collector. For example, a conventional 18650 cell with 18 mm diameter and 65 mm length may have electrodes that are between about 300 and 1000 mm long. Shorter electrodes corresponding to low rate/higher capacity applications are thicker and have fewer winds.

A cylindrical design may be desirable for some lithium ion cells because the electrodes swell during cycling and exert pressure on the casing. A round casing may be made sufficiently thin and still maintain sufficient pressure. Prismatic cells may be similarly wound, but their case may bend along the longer sides from the internal pressure. Moreover, the pressure may not be even within different parts of the cells and the corners of the prismatic cell may be left empty. Empty pockets may not be desirable within the lithium ions cells because electrodes tend to be unevenly pushed into these pockets during electrode swelling. Moreover, the electrolyte may aggregate and leave dry areas between the electrodes in the pockets negative effecting lithium ion transport between the electrodes. Nevertheless, for certain applications, such as those dictated by rectangular form factors, prismatic cells are appropriate. In some embodiments, prismatic cells employ stacks rectangular electrodes and separator sheets to avoid some of the difficulties encountered with wound prismatic cells.

Figure 7:
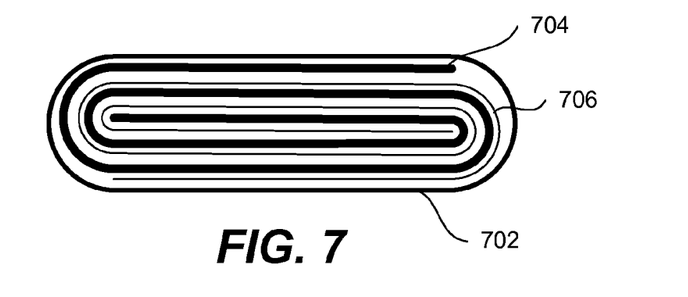
FIG. 7 is a top schematic view of an illustrative prismatic wound cell in accordance with certain embodiments.

FIG. 7 illustrates a top view of a wound prismatic jellyroll. The jelly roll comprises a positive electrode 704 and a negative electrode 706. The white space between the electrodes is representative of the separator sheets. The jelly roll is inserted into a rectangular prismatic case. Unlike cylindrical jellyrolls shown in FIGS. 6A and 6B, the winding of the prismatic jellyroll starts with a flat extended section in the middle of the jelly roll. In one embodiment, the jelly roll may include a mandrel (not shown) in the middle of the jellyroll onto which the electrodes and separator are wound.

Figure 8A:
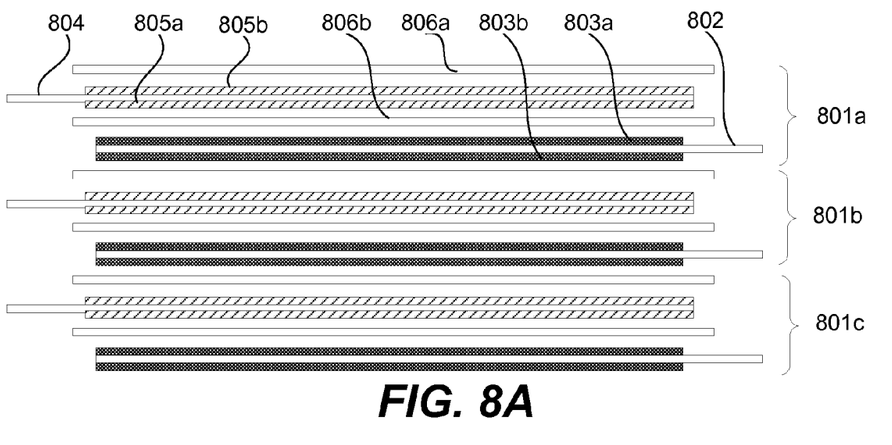
FIGS. 8A-B are a top schematic view and a perspective schematic view of an illustrative stack of electrodes and separator sheets in accordance with certain embodiments.
Figure 8B:
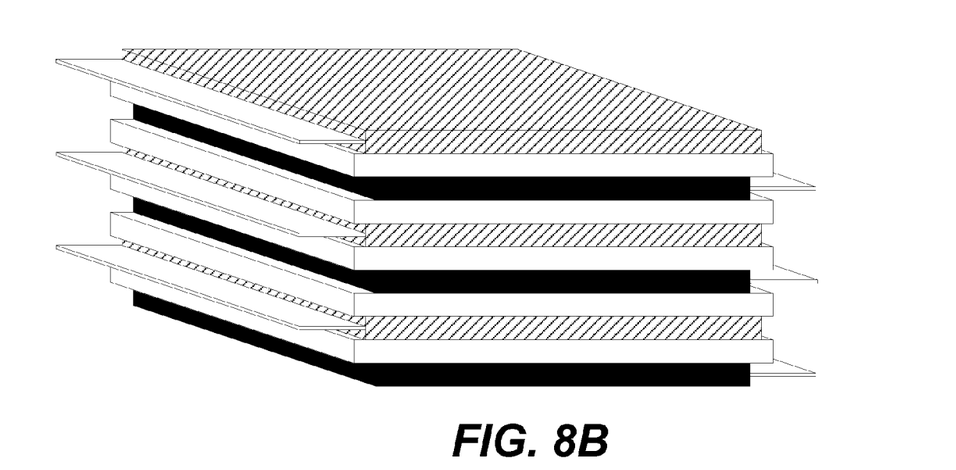

FIG. 8A illustrates a side view of a stacked cell including a plurality of sets (801a, 801b, and 801c) of alternating positive and negative electrodes and a separator in between the electrodes. One advantage of a stacked cell is that its stack can be made to almost any shape, and is particularly suitable for prismatic cells. However, such cell typically requires multiple sets of positive and negative electrodes and a more complicated alignment of the electrodes. The current collector tabs typically extend from each electrode and connected to an overall current collector leading to the cell terminal.

Once the electrodes are arranged as described above, the cell is filled with electrolyte. The electrolyte in lithium ions cells may be liquid, solid, or gel. The lithium ion cells with the solid electrolyte also referred to as a lithium polymer cells.

A typical liquid electrolyte comprises one or more solvents and one or more salts, at least one of which includes lithium. During the first charge cycle (sometimes referred to as a formation cycle), the organic solvent in the electrolyte can partially decompose on the negative electrode surface to form a solid electrolyte interphase layer (SEI layer). The interphase is generally electrically insulating but ionically conductive, allowing lithium ions to pass through. The interphase also prevents decomposition of the electrolyte in the later charging sub-cycles.

Some examples of non-aqueous solvents suitable for some lithium ion cells include the following: cyclic carbonates (e.g., ethylene carbonate (EC), propylene carbonate (PC), butylene carbonate (BC) and vinylethylene carbonate (VEC)), lactones (e.g., gamma-butyrolactone (GBL), gamma-valerolactone (GVL) and alpha-angelica lactone (AGL)), linear carbonates (e.g., dimethyl carbonate (DMC), methyl ethyl carbonate (MEC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitrites (e.g., acetonitrile and adiponitrile) linear esters (e.g., methyl propionate, methyl pivalate, butyl pivalate and octyl pivalate), amides (e.g., dimethyl formamide), organic phosphates (e.g., trimethyl phosphate and trioctyl phosphate), and organic compounds containing an S=O group (e.g., dimethyl sulfone and divinyl sulfone), and combinations thereof.

Non-aqueous liquid solvents can be employed in combination. Examples of the combinations include combinations of cyclic carbonate-linear carbonate, cyclic carbonate-lactone, cyclic carbonate-lactone-linear carbonate, cyclic carbonate-linear carbonate-lactone, cyclic carbonate-linear carbonate-ether, and cyclic carbonate-linear carbonate-linear ester. In one embodiment, a cyclic carbonate may be combined with a linear ester. Moreover, a cyclic carbonate may be combined with a lactone and a linear ester. In a specific embodiment, the ratio of a cyclic carbonate to a linear ester is between about 1:9 to 10:0, preferably 2:8 to 7:3, by volume.

A salt for liquid electrolytes may include one or more of the following: $LiPF_6$, $LiBF_4$, $LiClO_4$ $LiAsF_6$, $LiN(CF_3SO_2)_2$, $LiN(C_2F_5SO_2)_2$, $LiCF_3SO_3$, $LiC(CF_3SO_2)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, lithium salts having cyclic alkyl groups (e.g., $(CF_2)_2(SO_2)_{2x}Li$ and $(CF_2)_3(SO_2)_{2x}Li)$, and combination of thereof. Common combinations include $LiPF_6$ and $LiBF_4$, $LiPF_6$ and $LiN(CF_3SO_2)_2$, $LiBF_4$ and $LiN(CF_3SO_2)_2$.

In one embodiment the total concentration of salt in a liquid non-aqueous solvent (or combination of solvents) is at least about 0.3 M; in a more specific embodiment, the salt concentration is at least about 0.7M. The upper concentration limit may be driven by a solubility limit or may be no greater than about 2.5 M; in a more specific embodiment, no more than about 1.5 M.

A solid electrolyte is typically used without the separator because it serves as the separator itself. It is electrically insulating, ionically conductive, and electrochemically stable. In the solid electrolyte configuration, a lithium containing salt, which could be the same as for the liquid electrolyte cells described above, is employed but rather than being dissolved in an organic solvent, it is held in a solid polymer composite. Examples of solid polymer electrolytes may be ionically conductive polymers prepared from monomers containing atoms having lone pairs of electrons available for the lithium ions of electrolyte salts to attach to and move between during conduction, such as Polyvinylidene fluoride (PVDF) or chloride or copolymer of their derivatives, Poly(chlorotrifluoroethylene), poly(ethylene-chlorotrifluoro-ethylene), or poly(fluorinated ethylene-propylene), Polyethylene oxide (PEO) and oxymethylene linked PEO, PEO-PPO-PEO crosslinked with trifunctional urethane, Poly(bis(methoxy-ethoxy-ethoxide))-phosphazene (MEEP), Triol-type PEO crosslinked with difunctional urethane, Poly((oligo)oxyethylene)methacrylate-co-alkali metal methacrylate, Polyacrylonitrile (PAN), Polymethylmethacrylate (PNMA), Polymethylacrylonitrile (PMAN), Polysiloxanes and their copolymers and derivatives, Acrylate-based polymer, other similar solvent-free polymers, combinations of the foregoing polymers either condensed or cross-linked to form a different polymer, and physical mixtures of any of the foregoing polymers. Other less conductive polymers may be used in combination with the above polymers to improve strength of thin laminates include: polyester (PET), polypropylene (PP), polyethylene napthalate (PEN), polyvinylidene fluoride (PVDF), polycarbonate (PC), polyphenylene sulfide (PPS), and polytetrafluoroethylene (PTFE).

Figure 9:
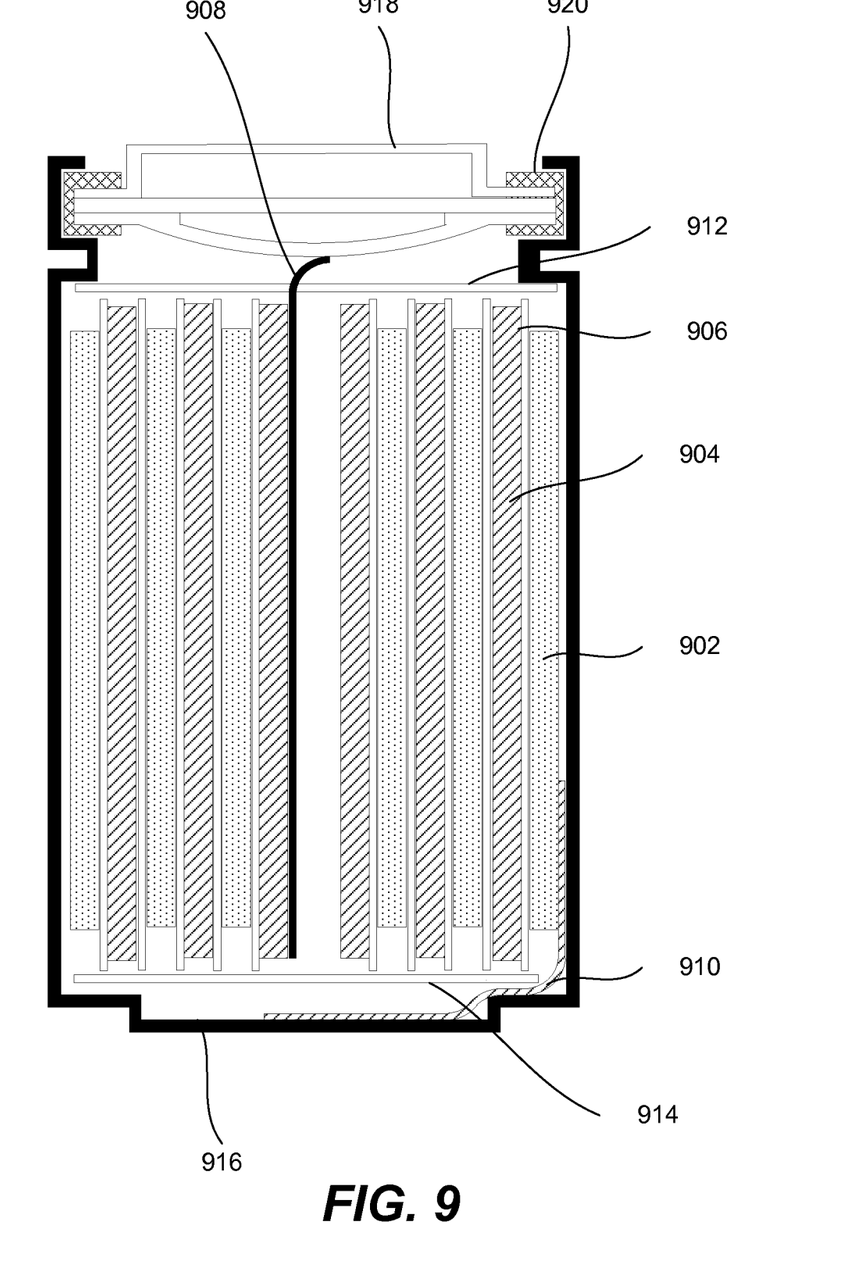
FIG. 9 is a schematic cross-section view of an example of a wound cell in accordance with embodiments.

FIG. 9 illustrates a cross-section view of the wound cylindrical cell in accordance with one embodiment. A jelly roll comprises a spirally wound positive electrode 902, a negative electrode 904, and two sheets of the separator 906. The jelly roll is inserted into a cell case 916, and a cap 918 and gasket 920 are used to seal the cell. In some cases, cap 912 or case 916 includes a safety device. For example, a safety vent or burst valve may be employed to break open if excessive pressure builds up in the battery. Also, a positive thermal coefficient (PTC) device may be incorporated into the conductive pathway of cap 918 to reduce the damage that might result if the cell suffered a short circuit. The external surface of the cap 918 may used as the positive terminal, while the external surface of the cell case 916 may serve as the negative terminal. In an alternative embodiment, the polarity of the battery is reversed and the external surface of the cap 918 is used as the negative terminal, while the external surface of the cell case 916 serves as the positive terminal. Tabs 908 and 910 may be used to establish a connection between the positive and negative electrodes and the corresponding terminals. Appropriate insulating gaskets 914 and 912 may be inserted to prevent the possibility of internal shorting. For example, a Kapton™ film may used for internal insulation. During fabrication, the cap 918 may be crimped to the case 916 in order to seal the cell. However prior to this operation, electrolyte (not shown) is added to fill the porous spaces of the jelly roll.

A rigid case is typically required for lithium ion cells, while lithium polymer cells may be packed into a flexible, foil-type (polymer laminate) case. A variety of materials can be chosen for the case. For lithium-ion batteries, Ti-6-4, other Ti alloys, Al, Al alloys, and 300 series stainless steels may be suitable for the positive conductive case portions and end caps, and commercially pure Ti, Ti alloys, Cu, Al, Al alloys, Ni, Pb, and stainless steels may be suitable for the negative conductive case portions and end caps.

A lithium ion battery, which may form or be part of a cell pack or a battery pack, includes one or more lithium ion electrochemical cells of this invention, each containing electrochemically active materials. In addition to the cells, a lithium ion battery may also include a power management circuit to control balance power among multiple cells, control charge and discharge parameters, ensure safety (thermal and electrical runaways), and other purposes. Individual cells may be connected in series and/or in parallel with each other to form a battery with appropriate voltage, power, and other characteristics.

CONCLUSION

Although the foregoing invention has been described in some detail for purposes of clarity of understanding, it will be apparent that certain changes and modifications may be practiced within the scope of the appended claims. It should be noted that there are many alternative ways of implementing the processes, systems, and apparatus of the present invention. Accordingly, the present embodiments are to be considered as illustrative and not restrictive, and the invention is not to be limited to the details given herein.

What is claimed is:

1. A negative electrode for use in a lithium ion cell, the negative electrode comprising:
  a substrate; and
  an active material disposed on the substrate and configured for inserting and removing lithium ions during battery cycling,
  wherein the active material includes lithium prior to assembly of the lithium ion cell,
  wherein the active material comprises one or more elements selected from the group consisting of silicon, germanium, and tin;
  wherein the active material forms an active layer and wherein there is a concentration gradient of lithium along the thickness of the active layer; and
  wherein the amount of lithium in the active material prior to assembly is between about 5% and 50% of the theoretical capacity of the active material.

2. The negative electrode of claim 1, wherein the active material further comprises carbon.

3. The negative electrode of claim 1, wherein lithium is integrated into the structure of the active material.

4. The negative electrode of claim 3, wherein the amount of lithium in the active material is between about 5% and 25% based on a theoretical capacity of the active material.

5. The negative electrode of claim 1, wherein a source of lithium is selected from the group consisting of lithium metal, lithium silicides, lithium-metal alloys, lithium salts, lithium oxide, and lithium nitride.

6. The negative electrode of claim 1, wherein a source of lithium forms an alloy with the active material.

7. The negative electrode of claim 1, wherein an intermediate layer is positioned between the substrate and the active layer.

8. The negative electrode of claim 1, wherein the concentration of lithium in the active layer is less adjacent to the substrate than the concentration of lithium near an exposed surface of the active layer.

9. The negative electrode of claim 1, wherein the active material comprises nanowires having an aspect ratio of at least about 10.

10. The negative electrode of claim 9, wherein the nanowires comprise substrate rooted nanowires.

11. The negative electrode of claim 1, wherein the active material comprises nanostructures having a core and a shell, wherein the shell has a different composition than the core.

12. The negative electrode of claim 11, wherein the concentration of lithium in the cores is on average greater than the concentration of lithium in the shells.

13. The negative electrode of claim 11, wherein the concentration of lithium in the cores is on average less than the concentration of lithium in the shells.

14. The negative electrode of claim 11, wherein the cores comprise silicon and the shells comprise carbon.

15. The negative electrode of claim 1, wherein the amount of lithium in the active material is sufficient to compensate for lithium losses during SEI layer formation.

* * * * *